Patented Nov. 8, 1949

2,487,746

UNITED STATES PATENT OFFICE 2,487,746

PHONOGRAPH RECORD COMPOSITION CONTAINING AS A BINDER SHELLAC AND COUMARONE-INDENE RESIN

Lawrence A. Wood, Jr., and William P. Miller, Indianapolis, Ind., assignors to Radio Corporation of America, a corporation of Delaware No Drawing. Application June 19, 1946, Serial No. 677,903

3 Claims. (Cl. 260—27)

This invention relates to the art of preparing resinous compositions suitable for molding and more particularly to improved compositions suitable for making phonograph records.

Many resinous compositions which have proven highly successful in making phonograph records contain shellac as their principal resinous ingredient. Shellac ordinarily contains a wax which tends to separate out when the shellac is mixed with the other ingredients of the record compositions and subjected to heat and pressure in the molding operation. For this reason, it has long been considered necessary to add a natural gum such as Manila or Congo copal in order to inhibit the tendency of the wax to separate from the shellac. The use of these gums is, however, undesirable from several viewpoints. First, like most natural products gathered from many different sources, the quality varies from time to time and from one local source to another. Second, the supply is always uncertain and subject to being cut off completely when transportation difficulties arise. And third, their cost often becomes prohibitive when world trade conditions become unsettled.

For the above reasons, it appears to be highly desirable to substitute a more reliable ingredient for the natural gums. One object of the present invention is to substitute a synthetic resin for the natural gum in molding compositions containing shellac. Another object is to provide an improved molding composition containing a resin of the coumarone-indene family as a substitute for natural gums. Another object is to provide a molding composition from which improved phonograph records can be made.

The essence of the present invention resides in the discovery that resins of the coumarone-indene family can advantageously be used in shellac molding compositions in place of natural gums since they effectively dissolve and prevent the separation of the natural wax found in shellac. Not only can coumarone-indene resins be used but coumarone polymers and indene polymers as well.

By varying the percentage of the coumarone-indene resin used in the compositions as well as the amount of fillers incorporated, resins of this family having almost any melting point may be used effectively. However, it is preferred to use those resins having a softening point of 115–120° C. The preferred range of coumarone-indene resin is from 2 to 10 percent of the amount of shellac present although larger percentages of these resins may be used in the production of satisfactory molding compositions.

Typical compositions falling within the concept of the present invention can be made up by using the various ingredients within the ranges set forth in the following example.

Example

| | Per cent by weight |
|---|---|
| Shellac | 5–45 |
| Coumarone-indene resin | 0.1–5 |
| Gasoline insoluble, aromatic hydrocarbon soluble resinous extract of pinewood | 0–12 |
| Carbon black | 1–3 |
| Mineral fillers | 50–80 |
| Zinc stearate | 0.25–1.0 |

As stated previously, the coumarone-indene resins may be replaced by similar amounts of either coumarone or indene polymers.

The preferred form of gasoline insoluble, aromatic hydrocarbon soluble resinous extract of pinewood used in these compositions has a melting point range of 115–120° C. although the melting point may vary over a much wider range. As seen from the above example, this resin may be omitted entirely from the composition and when present usually replaces part of the shellac in the ratio of 1:1.

The mineral fillers, which usually contribute the major portion of the weight of the compositions, may be any one of numerous clays or slates, diatomaceous earth, other silicates, or finely divided calcium carbonate. Almost any proportion of filler may be used up to about 80 percent of the total composition by weight. Proportions smaller than 50 percent are impractical for record compositions, however, due to the low strength of the product which results and the relatively high cost when a large proportion of shellac is used.

The small percentages of zinc stearate are preferred although not absolutely necessary. This substance acts as a mold lubricant to prevent pressings from sticking to the mold surface. Any other metallic soaps may be used for the same purpose, as well as organic soaps, stearic acid, natural or synthetic waxes, etc.

Various percentages of carbon black are conventional in this type of molding composition, the percentages given in the above example merely being illustrative. The purpose served is mainly that of a pigment and this could be omitted entirely if desired.

There have thus been disclosed improved molding compositions in which shellac is the principal resinous ingredient. The natural gums usually present in this type of composition for the purpose of dissolving the natural wax which accompanies the shellac have been replaced with resins of the coumarone-indene family. This results in better molding properties and more uniformity of product.

We claim as our invention:

1. An article according to claim 3, including 1-3 percent of carbon black.

2. An article according to claim 3 in which said synthetic resin polymer has a softening point of 115-120° C.

3. A phonograph record made up of a composition including a binder consisting of 5-45 percent shellac, 0.1-5.0 percent of a synthetic resin polymer from the class consisting of coumarone-indene copolymers, coumarone polymers and indene polymers and up to 12 percent of the gasoline insoluble, aromatic hydrocarbon soluble resinous extract of pinewood, and the remainder comprising 50-80 percent of a filler and 0.25-1.0 percent of a mold lubricant.

LAWRENCE A. WOOD, Jr.
WILLIAM P. MILLER.

REFERENCES CITED

The following references are of record in the file of this patent:

UNITED STATES PATENTS

| Number | Name | Date |
| --- | --- | --- |
| 1,953,951 | Boughton | Apr. 10, 1934 |
| 1,997,572 | Bren | Apr. 16, 1935 |
| 2,114,393 | Lane | Apr. 19, 1938 |
| 2,130,239 | Hunter | Sept. 13, 1938 |